(12) United States Patent
Seal et al.

(10) Patent No.: US 8,631,944 B2
(45) Date of Patent: Jan. 21, 2014

(54) SOIL PROCESSING METHOD AND APPARATUS

(75) Inventors: Nicolas Seal, Cobham (GB); Daniel Rudland, Ashen (GB)

(73) Assignee: Environet UK Limited, Cobham, Surrey (GB)

( * ) Notice: Subject to any disclaimer, the term of this patent is extended or adjusted under 35 U.S.C. 154(b) by 351 days.

(21) Appl. No.: 12/935,896

(22) PCT Filed: Mar. 24, 2009

(86) PCT No.: PCT/GB2009/050274
§ 371 (c)(1),
(2), (4) Date: Mar. 17, 2011

(87) PCT Pub. No.: WO2009/122197
PCT Pub. Date: Oct. 8, 2009

(65) Prior Publication Data
US 2011/0155654 A1 Jun. 30, 2011

(30) Foreign Application Priority Data
Apr. 4, 2008 (GB) .................................. 0806134.3

(51) Int. Cl.
*B03B 9/00* (2006.01)
(52) U.S. Cl.
USPC ............. 209/10; 209/702; 171/127; 171/132; 47/1.42
(58) Field of Classification Search
USPC ........... 209/10, 244, 702, 705, 920, 942, 577; 171/26, 40, 123, 127, 132; 47/1.42
See application file for complete search history.

(56) References Cited

U.S. PATENT DOCUMENTS

| | | | |
|---|---|---|---|
| 915,110 A | 3/1909 | Pickel | |
| 1,333,493 A * | 3/1920 | Kilkenny | 171/20 |
| 1,457,996 A | 4/1922 | Nelson | |
| 1,465,190 A * | 8/1923 | Stewart | 15/3.17 |
| 1,880,611 A * | 10/1932 | Vodon | 171/132 |

(Continued)

FOREIGN PATENT DOCUMENTS

EP 0 974 702 A2 1/2000

OTHER PUBLICATIONS

"Managing Japanese Knotweed on Development Sites—the Knotweed Code of Practice," *Environment Agency*, http://www.environment-agency.gov.uk/commondata/acrobat/japnkot_1_a_1463028.pdf-and-http://www.environment-agency.gov.uk.commondata/acrobat/jpknot_2_1463056.pdf, Oct. 2006.

*Primary Examiner* — Joseph C Rodriguez
(74) *Attorney, Agent, or Firm* — Blakely Sokoloff Taylor & Zafman

(57) ABSTRACT

A method and apparatus (1) for processing soil infested with plant root material. The method comprises depositing the soil on a vibrating conveyor support (105) at a substantially constant depth, wherein the vibrating conveyor support (105) is arranged to enable the plant root material to be hand-picked. In this way, soil throughput may be maximised without compromising removal of the plant root material. Further, fragmentation of the plant root material may be minimised. The soil may be screened using a vibrating screening mesh (107) to remove smaller particles prior to it being deposited on the conveyor. The soil may be heated, and the processed soil passed under an infrared detector (119) for detecting the presence of plant root material, to thereby objectively control quality.

12 Claims, 3 Drawing Sheets

(56) References Cited

U.S. PATENT DOCUMENTS

| | | | |
|---|---|---|---|
| 2,110,997 A * | 3/1938 | Mayfield | 171/132 |
| 2,716,932 A | 9/1955 | Grounds | |
| 2,783,698 A * | 3/1957 | Bambi | 172/32 |
| 2,793,747 A * | 5/1957 | Pridy | 171/130 |
| 3,596,717 A | 8/1971 | Knudsen | |
| 3,921,724 A * | 11/1975 | Horton et al. | 171/117 |
| 4,060,133 A * | 11/1977 | Bettencourt et al. | 171/1 |
| 4,392,533 A * | 7/1983 | Bittle | 171/14 |
| 4,560,008 A * | 12/1985 | Carruthers | 171/14 |
| 4,998,826 A * | 3/1991 | Wood et al. | 374/129 |
| 5,263,591 A * | 11/1993 | Taormina et al. | 209/630 |
| 5,389,781 A * | 2/1995 | Beck et al. | 250/226 |
| 5,477,926 A | 12/1995 | Lizotte et al. | |
| 6,183,159 B1 * | 2/2001 | Hashimoto et al. | 404/76 |
| 6,183,532 B1 | 2/2001 | Celli | |
| 6,192,992 B1 * | 2/2001 | Gossop | 172/133 |
| 7,408,145 B2 * | 8/2008 | Holland | 250/221 |
| 2002/0185284 A1 * | 12/2002 | Bendix et al. | 171/10 |
| 2004/0111960 A1 | 6/2004 | Smullen et al. | |
| 2007/0051669 A1 * | 3/2007 | Mandrell et al. | 209/240 |
| 2009/0178957 A1 * | 7/2009 | Mathis et al. | 209/3.1 |
| 2013/0114641 A1 * | 5/2013 | Sutton | 374/121 |

* cited by examiner

SOIL PROCESSING METHOD AND APPARATUS

This is a non-provisional application claiming the benefit of International application number PCT/GB2009/050274 filed Mar. 24, 2009.

This invention relates to an apparatus for extracting plant root material. More particularly, but not exclusively, this invention relates to an apparatus for extracting plant root material of the species *Fallopia Japonica* (Japanese knotweed) from soil or other ground material.

Japanese knotweed, which is not native to the UK, is considered a highly invasive weed. It is currently spreading throughout the UK, due in part to its tolerance of a wide variety of soil types. Soil infested with Japanese knotweed roots and rhizome is classified as "controlled waste" and therefore subject to waste legislation.

Japanese knotweed represents a particular problem for construction projects on infested sites. If the rhizome is simply left in the ground, it may regenerate and then causes damage to property structures, drains and hard surfaces, and will continue to spread within the ground. The presence of Japanese knotweed roots and rhizome on the sites of construction projects often cannot therefore be ignored, and may add substantially to development costs and lead to significant project delays.

A known method for dealing with Japanese knotweed is to excavate all infested soil and transport it to a licensed landfill site for disposal. The volumes of infested soil can be considerable, since the rhizome system can extend to a depth of 3 metres or more, and extend laterally by as much as 7 metres from the visible above-ground shoots. This method is becoming prohibitively expensive and is clearly the least favoured option from the viewpoint of environmental sustainability.

Alternative methods for dealing with Japanese knotweed on the sites of construction projects have been developed. For example, herbicides can be applied in the hope of killing all parts of the plant, including the root and rhizome system. The success of herbicide treatment depends on many factors and at best is likely to take one growing season, but can take as many as three or more growing seasons. This method does not therefore provide an acceptable solution for construction projects, where there may only be a matter of a few weeks available.

It is also known to use sifting, or screening, techniques for removing Japanese knotweed from soil. Such techniques typically employ readily available trommeling apparatus designed for screening topsoil or grading aggregates.

WO 2004/040958 A2 discloses a method for dealing with Japanese knotweed which is based on the principle of shredding and grinding the rhizome to a size whereby it no longer remains viable.

According to an aspect of the present invention, there is provided a method of processing soil infested with plant root material comprising depositing the soil on a vibrating conveyor support, wherein the vibrating conveyor support is arranged to convey the soil and to expose the plant root material, to thereby enable the plant root material to be hand-picked.

The invention recognises that removal of the plant root material from infested soil is the preferred means of treatment. The invention also recognises that known mechanical screening methods for removing the plant root material are not completely successful because they lead to a degree fragmentation of the plant root material. By providing a vibrating conveyor support, it has been found that plant root material can be accurately hand-picked from infested soil, while at the same time maintaining acceptable rates of soil throughput.

The soil is preferably deposited on the vibrating conveyor support at a substantially constant speed and/or depth to enable any plant root material to be identified by eye and manually hand-picked. The speed and/or depth of soil on the vibrating conveyor support may, however, be varied in response to a change in the degree of infestation of the soil.

The vibrating conveyor support may be provided with fixed tined rakes arranged across the surface of the vibrating conveyor support for evenly spreading the soil prior to hand-picking.

The soil may be screened prior to it being deposited on the vibrating conveyor support, whereby particles having less than a predetermined size are removed. For example, a screening mesh may be used to remove particles having less than a predetermined size in the range 5 mm to 15 mm, preferably 8 to 12 mm, and most preferably about 10 mm. The predetermined size is selected on the basis that smaller fragments of plant root material are not viable under the relevant environmental conditions.

The soil may be deposited into the screening mesh (or a conveyor support feeding the screening mesh) from a hopper. In this case, the hopper is arranged to provide a controllable flow of soil.

Preferably, the method further comprises heating the soil, and passing processed soil under an infrared detector for detecting the presence of plant root material. Since soil and plant root material have different specific heat capacities, differences in temperature detected by the infrared detector may be used to identify fragments of plant root material which have not been picked.

The differences in temperature detected by the infrared detector may result from differential heating rates or differential cooling rates of the soil and plant root material. Embodiments in which the processed soil is allowed to partially cool before being passed under the infrared detector are, however, preferred.

The results of the detection, which may be performed by a computer, may be logged for quality control purposes, or may be used to trigger an alarm means.

According to another aspect of the invention, there is provided an apparatus for processing soil infested with plant root material, the apparatus comprising a vibrating conveyor support on which the soil is deposited, wherein the vibrating conveyor support is arranged to convey the soil and to expose the plant root material, to thereby enable the plant root material to be hand-picked.

The apparatus may further comprise a hopper arranged to deposit the soil on the vibrating conveyor support at a substantially constant depth.

The apparatus may further comprise a screening mesh for screening the soil prior to it being deposited on the vibrating conveyor support, whereby particles having less than a predetermined size are removed. The predetermined size may be in the range 5 mm to 15 mm, preferably 8 mm to 12 mm, and most preferably about 10 mm. The screening mesh may be a vibrating screening mesh.

The apparatus may further comprise: means for heating the soil; and an infrared detector for detecting the presence of plant root material in processed soil.

Preferred embodiments of the invention will now be described, merely by way of example, with reference to the drawings in which.

The invention provides a method of processing soil infested with plant root material. The method essentially comprises depositing the soil on a vibrating conveyor support. The vibrating conveyor support is arranged to convey the soil and to expose the plant root material, to thereby enable the plant root material to be hand-picked. The invention also provides an apparatus for processing soil comprising the vibrating conveyor support.

Figure 1:
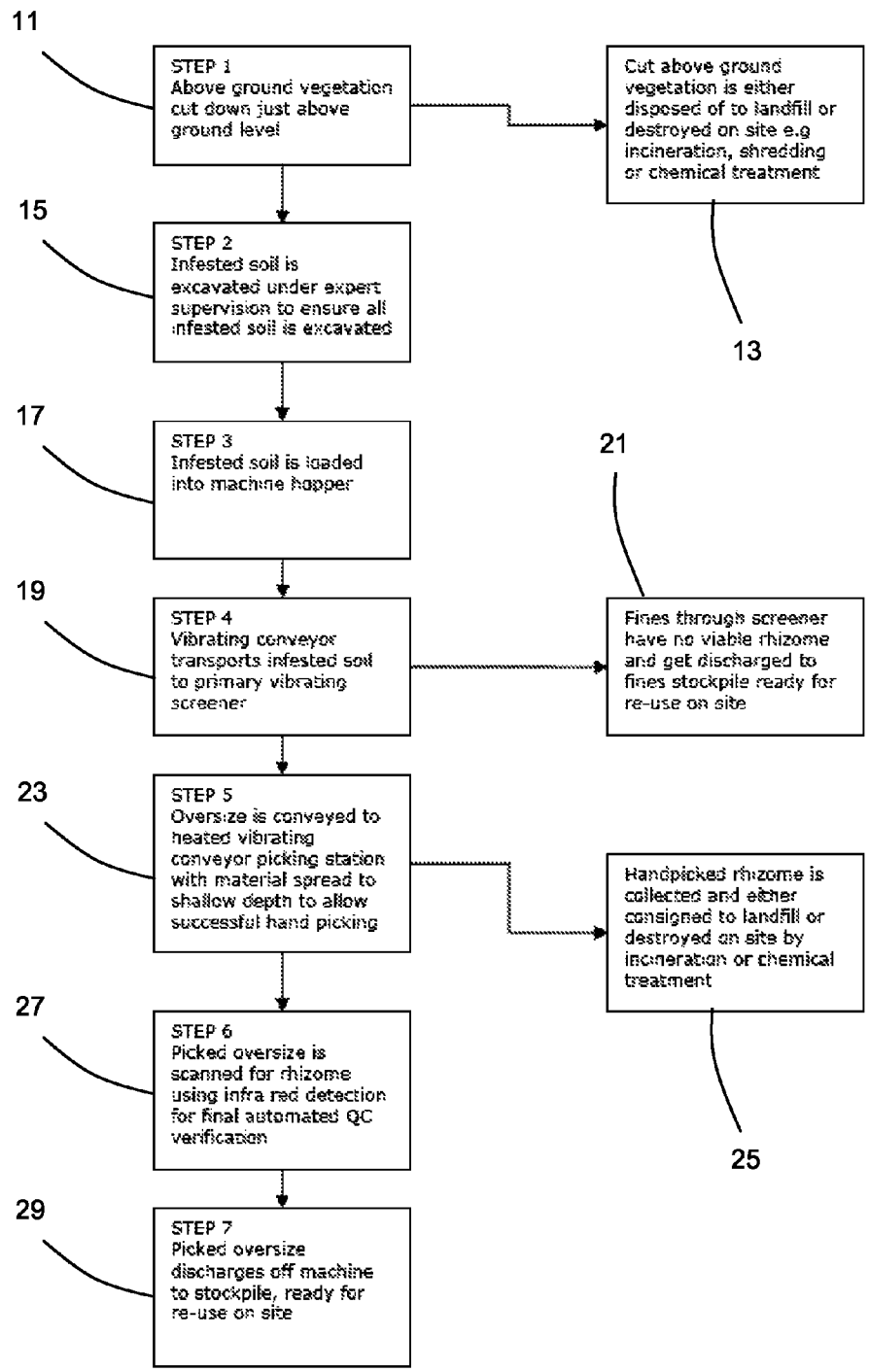
FIG. 1 is a flow diagram for a method of processing soil according to the invention.

FIG. 1 illustrates a specific embodiment of the method according to the invention. Referring to the Figure, a first step of the method involves the clearance of all above-ground vegetation 11, according to which the vegetation is cut just above the ground level. The cleared vegetation, which includes Japanese knotweed foliage, is either disposed of to landfill or destroyed on site 13, for example by incineration, shredding or chemical treatment.

Once the above ground vegetation has been cleared, soil infested with Japanese knotweed rhizome is excavated using a mechanical excavator 15. The soil is excavated to a depth and lateral distance from visible plant material sufficient to ensure that no viable rhizome can remain in place. The excavated soil is loaded into a hopper 17, which hopper is arranged to provide a steady flow of soil onto a first vibrating conveyor support.

The first vibrating conveyor support has a vibrating surface for conveying the soil and breaking up larger clods of soil. Suitable vibrating conveyor supports are those conventionally used for conveying small components in manufacturing facilities, and are widely available. The vibrating conveyor support conveys the infested soil to a screening station 19. At the screening station, the soil is fed across a vibrating screening mesh for removing particles below a predetermined size, known as "fines" 21. A mesh size of 10 mm is employed in the screening station for removing the fines, since fragments of rhizome below this size are known to be unviable (or at least easily treatable with herbicides). The fines which are extracted by the screening station are then discharged to a storage area ready for re-use on site.

The reduced volume of soil constituting the particles that are equal to or larger than the predetermined size, known as the "oversize", is transferred using a second vibrating conveyor support to a hand-picking station 23. This second vibrating conveyor support also has a vibrating surface, is similar to the first vibrating conveyor support and has been found to effectively bring the larger remaining fragments of rhizome to the top without causing further fragmentation. The oversize which is deposited on the second vibrating conveyor support is heated by radiation from an infrared heater.

At the hand-picking station, fragments of rhizome are identified by eye by operators and are hand-picked from the second vibrating conveyor support 25 as the oversize is conveyed. The hand-picked rhizome is collected and then either disposed of to landfill or destroyed on site 13, for example by incineration, shredding or chemical treatment. The speed of the second vibrating conveyor support is generally maintained at a constant rate, but may be adjusted by the operator dependent on the degree of soil infestation and/or the number of operators. A speed of approximately 0.2 m/s has been found to be suitable for typical levels of infestation and a pair of operators.

The depth of oversize on the second vibrating conveyor support is controlled by adjusting the outlet rate of the hopper and/or the speed of the first vibrating conveyor support coupling the hopper to the screening station. An oversize depth of approximately 10 mm has been found to maximise soil throughput without compromising identification and removal of the rhizome. Fixed tined rakes are additionally provided across the second vibrating conveyor support for evenly spreading the soil.

After the fragments of rhizome have been hand-picked, the remaining oversize passes along an unheated section of the second vibrating conveyor support, to allow for some cooling, before passing under an infrared detector in the form of a digital infrared camera 27. The infrared camera obtains and outputs digital infrared images of the oversize, which output is transmitted to a computer.

The computer uses the output from the infrared camera to identify fragments of rhizome remaining in the hand-picked oversize. These fragments are identified by analysing the digital infrared images and detecting variations in temperature intensity caused by the difference in the specific heat capacities of soil and rhizome.

When the computer identifies fragments of rhizome remaining in the hand-picked oversize, an alarm is activated, to thereby alert the operator, and/or the vibrating conveyor supports are stopped. The operator may then manually remove the identified rhizome. Rhizome identification information from the computer can also be stored as a quality control record.

After passing under the infrared detector, the hand-picked oversize is discharged to a storage area ready for re-use on site.

The method enables sites infested with Japanese knotweed to be cleared quickly and reliably. The use of a single screening station, vibrating conveyor supports and a hand-picking station prevents fragmentation of the rhizome, which is a characteristic of known mechanical separation techniques.

Figure 2:
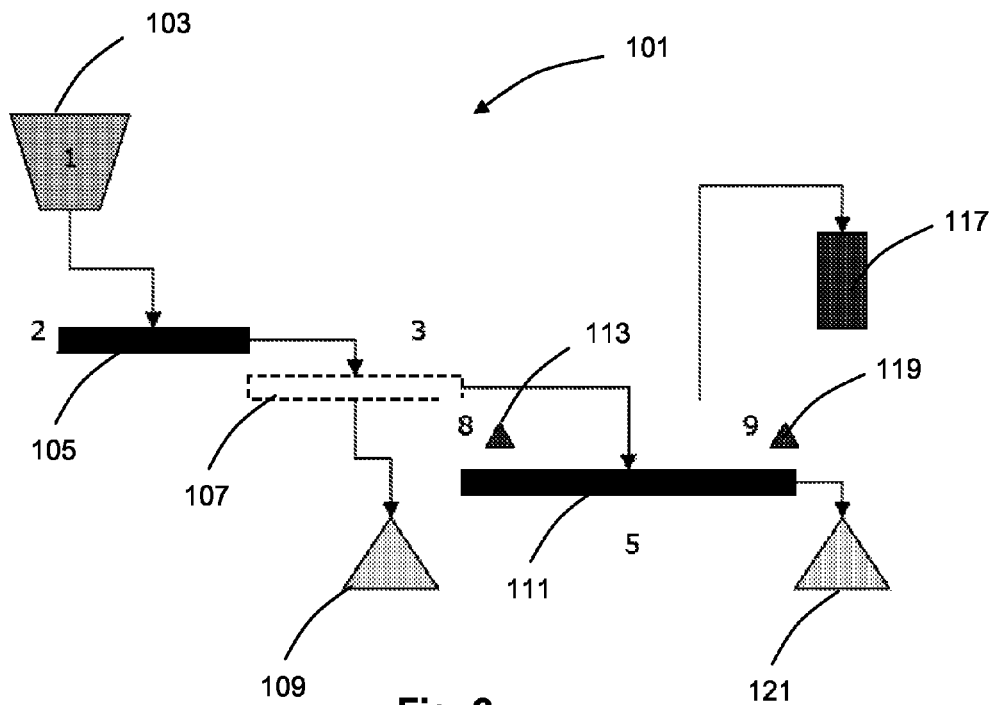
FIG. 2 is a schematic diagram of an apparatus for processing soil according to the invention.
Figure 3:
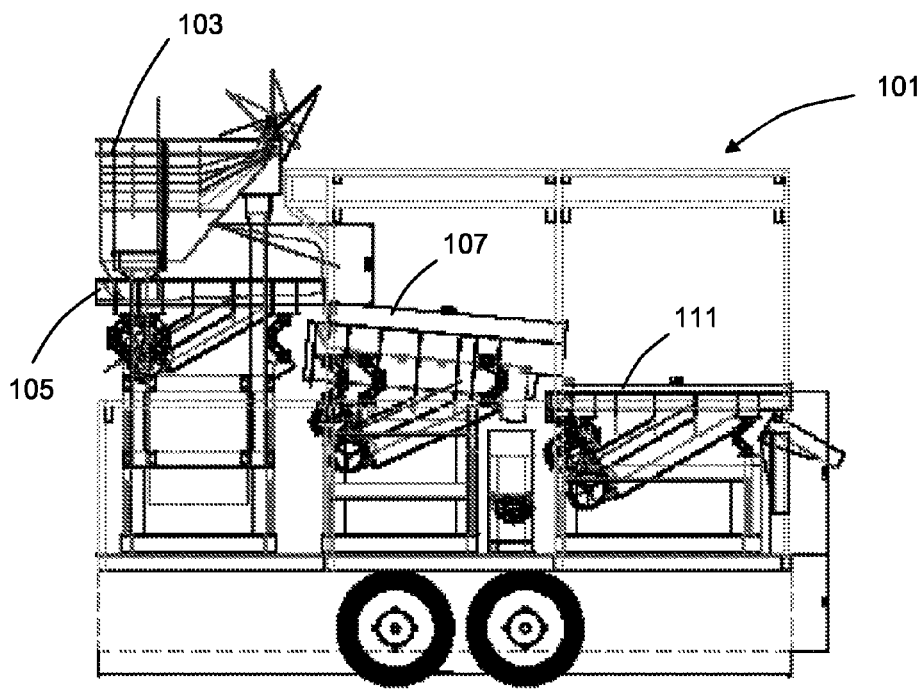
FIG. 3 is a side view of the apparatus schematically shown in FIG. 2 provided on a vehicle trailer.
Figure 4:
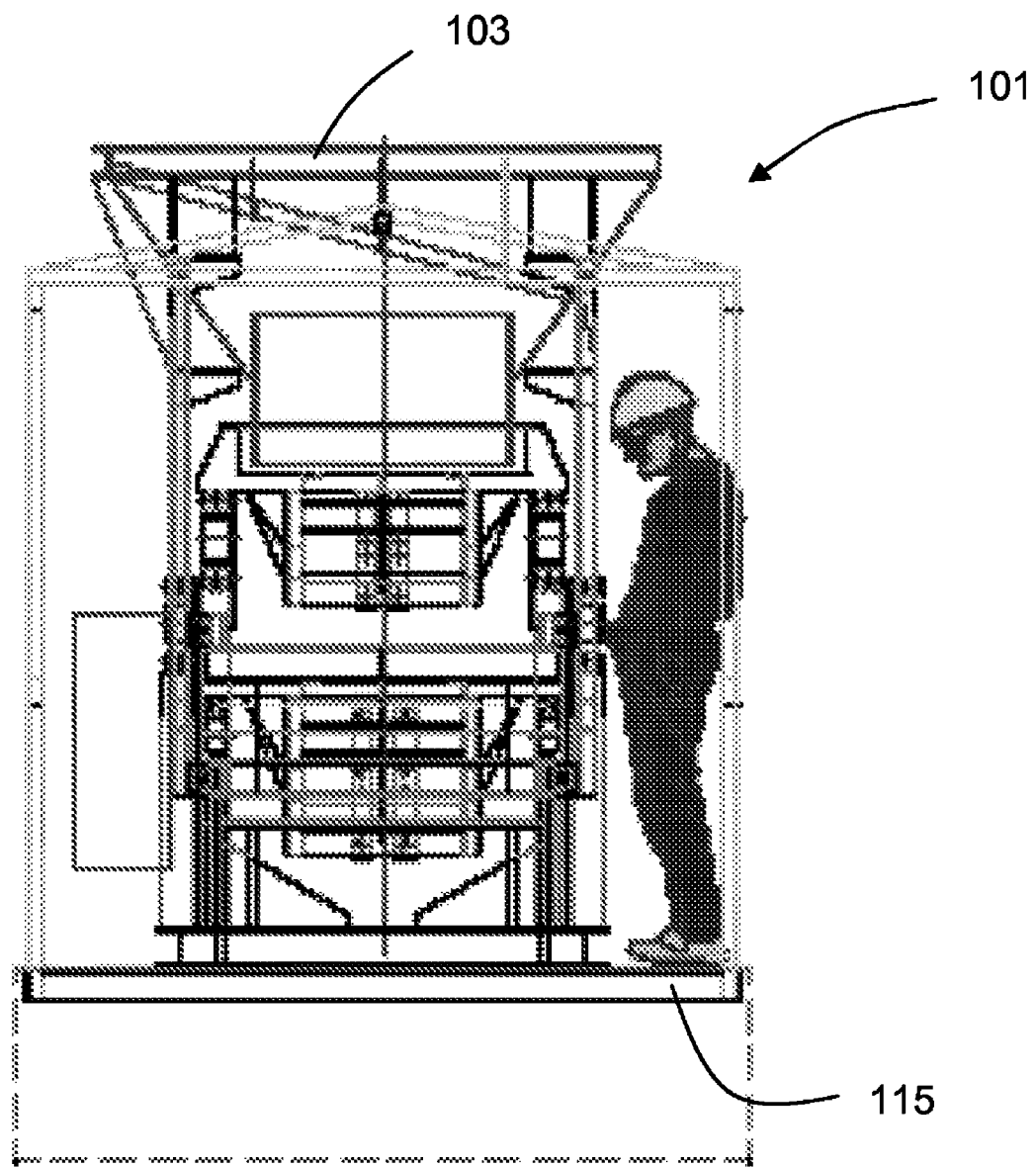
FIG. 4 is an end view of the apparatus shown in FIG. 3.

An apparatus 101 according to the invention is schematically illustrated in FIG. 2, with side and end views being shown in FIGS. 3 and 4 respectively. As can be seen, the apparatus 101 is conveniently provided on a vehicle trailer for transportation between sites. The apparatus 101 is powered using an electric generator or a site power supply, where available.

The apparatus 101 comprises a hopper 103 into which infested soil is loaded using mechanical excavating equipment. The hopper 103 discharges the infested soil at a steady rate onto a first vibrating conveyor support 105.

The first vibrating conveyor support 105 transfers the infested soil to a screening station 107. The screening station 107 is provided with a vibrating screening mesh provided with square apertures of 10 mm and an effective free area of 30 to 40%. The screening station 107 extracts fines from the infested soil, which fines are transferred to a storage area 109 for re-use.

The oversize is transferred from the screening station 107 to a second vibrating conveyor support 111. An upstream end of the second vibrating conveyor support 111 is provided with an infrared heater 113 for heating the oversize.

The second vibrating conveyor support 111 is arranged to vibrate, to thereby bring the larger remaining fragments of rhizome to the top.

The second vibrating conveyor support 111 is arranged to enable fragments of rhizome to be hand-picked by an operator, for which purpose the conveying speed may be adjustable. As can be seen in FIGS. 3 and 4, a deck 115 is provided for the operator to stand on. Hand-picked fragments of rhizome are collected in a storage area 117 either for disposal to landfill or for destruction on site 13, for example by incineration, shredding or chemical treatment.

The hand-picked oversize passes under an infrared detector in the form of a digital infrared camera 119, provided at a downstream end of the second vibrating conveyor support 111, which camera is used for detecting fragments of rhizome remaining in the hand-picked oversize.

The hand-picked oversize is discharged from the second vibrating conveyor support 111 to a storage area 121 ready for re-use on site.

Specific embodiments have been described above. Various modifications may therefore be made without departing from the scope of the invention, which is defined by the claims.

For example, in embodiments, the screening process and station may be omitted, as may the infrared heater and detector. Where the infrared heater and detector are provided, these may take forms other than those described above. For example, the detector may be a one-dimensional array of individual detectors.

The first vibrating conveyor support and the screening station may be integrated into a single unit, with the screening mesh of the screening station immediately following the vibrating conveyor support.

The fines and/or the hand-picked oversize discharged from the screening station and the picking station, respectively, may be conveyed onwards by endless-belt or other types of conveyors to respective storage areas.

The invention claimed is:

1. A method of processing soil infested with plant root material comprising:
   depositing the soil on a vibrating conveyor support, wherein the vibrating conveyor support is arranged to convey the soil and to expose the plant root material, to thereby enable the plant root material to be hand-picked; and
   hand-picking the plant root material from the soil on the vibrating conveyor support,
   wherein the soil is heated, and wherein the processed soil is passed under an infrared detector for detecting the presence of plant root material.

2. The method according to claim 1, wherein the soil is deposited on the vibrating conveyor support at a substantially constant depth.

3. The method according to claim 1 or 2, wherein the soil is screened prior to it being deposited on the vibrating conveyor support, whereby particles having less than a predetermined size are removed.

4. The method according to claim 3, wherein the soil is screened using a screening mesh, and wherein the predetermined size is in the range 5 mm to 15 mm.

5. The method according to claim 4, wherein the screening mesh is a vibrating screening mesh.

6. The method according to claim 1, wherein the soil is deposited on the vibrating conveyor support from a hopper.

7. The method according to claim 1, wherein the step of hand picking the plant root material comprises an operator standing on a deck while hand picking the plant root material.

8. An apparatus for processing soil infested with plant root material, the apparatus comprising:
   a vibrating conveyor support on which the soil is deposited, wherein the vibrating conveyor support is arranged to convey the soil and to expose the plant root material, to thereby enable the plant root material to be hand-picked;
   means for heating the soil; and
   an infrared detector, wherein the infrared detector is arranged to detect the presence of plant root material in heated soil that has been subjected to hand-picking, to thereby identify fragments of plant root material that have not been hand-picked.

9. The apparatus according to claim 8, further comprising a hopper arranged to deposit the soil on the vibrating conveyor support at a substantially constant depth.

10. The apparatus according to claim 8 or 9, further comprising a screening mesh for screening the soil prior to it being deposited on the vibrating conveyor, support, whereby particles having less than a predetermined size are removed.

11. The apparatus according to claim 10, wherein the predetermined size is in the range 5 mm to 15 mm.

12. The apparatus according to claim 10, wherein the screening mesh is a vibrating screening mesh.

* * * * *